(12) United States Patent
Osuga et al.

(10) Patent No.: US 6,880,700 B2
(45) Date of Patent: Apr. 19, 2005

(54) STICK-TYPE CONNECTED NAILS

(75) Inventors: Satoshi Osuga, Tokyo (JP); Mitsugu Takezaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 73 days.

(21) Appl. No.: 09/933,706

(22) Filed: Aug. 22, 2001

(65) Prior Publication Data

US 2002/0023854 A1 Feb. 28, 2002

(30) Foreign Application Priority Data

Aug. 23, 2000 (JP) .................................. P2000-252884

(51) Int. Cl.⁷ ............................................. B65D 85/24
(52) U.S. Cl. ..................... 206/343; 206/344; 206/820
(58) Field of Search ................................ 206/343, 344, 206/345, 346, 338, 813, 820, 206; 411/443; 227/120

(56) References Cited

U.S. PATENT DOCUMENTS

| | | | |
|---|---|---|---|
| 3,212,632 A | 10/1965 | Baum et al. .................. 206/56 |
| 3,357,761 A | * 12/1967 | Langas et al. ............... 206/344 |
| 3,437,249 A | 4/1969 | Baum .......................... 227/120 |
| 3,442,374 A | * 5/1969 | Hillier ......................... 206/344 |
| 4,343,579 A | * 8/1982 | Shelton et al. .............. 206/345 |
| 5,482,420 A | 1/1996 | Gabriel et al. .............. 411/442 |

FOREIGN PATENT DOCUMENTS

| | | |
|---|---|---|
| DE | 296 17 764 U1 | 1/1997 |
| EP | 0 053 828 A1 | 6/1982 |
| EP | 1 207 017 A2 | 5/2002 |

* cited by examiner

Primary Examiner—Mickey Yu
Assistant Examiner—J. Gregory Pickett
(74) Attorney, Agent, or Firm—Morgan Lewis & Bockius LLP

(57) ABSTRACT

In stick type connected nails, connecting bands are glued to two portions, that is, upper ends and lower ends of shaft portions of nails which are arranged in parallel in an equidistant manner so as to connect the nails to each other. By providing the connecting bands at two portions, that is, the upper and lower portions, when plural sheets of connected nails are loaded in a multiple loading type nail magazine in a superposed manner, heads and distal end portions of the neighboring connecting nails are not entangled in a staggered manner. Hence, the smooth nail feeding can be realized.

8 Claims, 5 Drawing Sheets

STICK-TYPE CONNECTED NAILS

BACKGROUND OF THE INVENTION

1. Field of the Invention

The present invention relates to stick-type connected nails which are used for a nailing machine, and more particularly to stick-type connected nails which can prevent the entanglement of nails when a plurality of nails are superposed.

2. Description of the Related Art

With respect to connected nails which are used for a nailing machine, there are roll-type connected nails which are formed by connecting nails with a plastic belt or a wire and connected nails such as stick-type connected nails 1 shown in FIG. 7 which are formed by arranging large-sized nails 2 in parallel in an equidistant manner and by connecting the nails by gluing a connecting band 3 such as a craft paper or the like on vertically midst portions of shaft portions of the nails 2.

The stick-type connected nails 1 which cannot be bent has a relatively small number of nails per a sheet. Accordingly, in a nailing machine of a general type which loads a sheet of stick-type connected nails in a nail magazine, the stick-type connected nails have to be frequently replenished during a nailing operation.

If there would be a mechanism which is formed such that a plurality of sheets of stick-type connected nails are loaded in a nail magazine in a superposed manner and the stick-type connected nails can be fed one by one, such a mechanism is convenient since it could reduce the number of replenishment of connected nails. Actually there is a nailing machine of a multiple loading type which has such a constitution. However, when the conventional stick-type connected nails 1 are loaded in a nail magazine in a superposed manner, as shown in FIG. 8 and FIG. 9, between respective nails which constitute a sheet of stick-type connected nails 1a, heads H or shaft portions S of neighboring stick-type connected nails 1b are tangled so that the stick-type connected nails 1a cannot be fed.

To solve such a problem, the above-mentioned nailing machine provides a separator to a nail magazine, wherein the separator which is inserted between neighboring stick-type connected nails to separate two sheets of stick-type connected nails is mounted in the inside of the nail magazine and the separator and a nail feeding pawl are operated in an interlocking manner to prevent the entanglement of the connected nails. However, this makes the mechanism of the nail magazine complicated. Thus, the cost is increased and the nailing machine becomes large-sized thus lowering the operability of the nailing machine.

SUMMARY OF THE INVENTION

Here arises a technical task to be solved by the invention which prevents the entanglement of the nails when the stick-type connected nails are loaded in a superposed manner and realizes the nail feeding even when a particular mechanism such as the separator is not provided to the nail magazine. It is an object of the present invention to solve such a task.

The present invention is proposed to achieve the above-mentioned object and provides stick-type connected nails which arrange a plurality of nails in parallel in an equidistant manner and connect a plurality of nails by gluing connecting bands made of paper, resin or the like to shaft portions of the nails, wherein the connecting bands are glued to shaft portions of the nails at positions in the vicinity of upper ends and lower ends of the shaft portions.

DETAILED DESCRIPTION OF THE PREFERRED EMBODIMENTS

Figure 1:
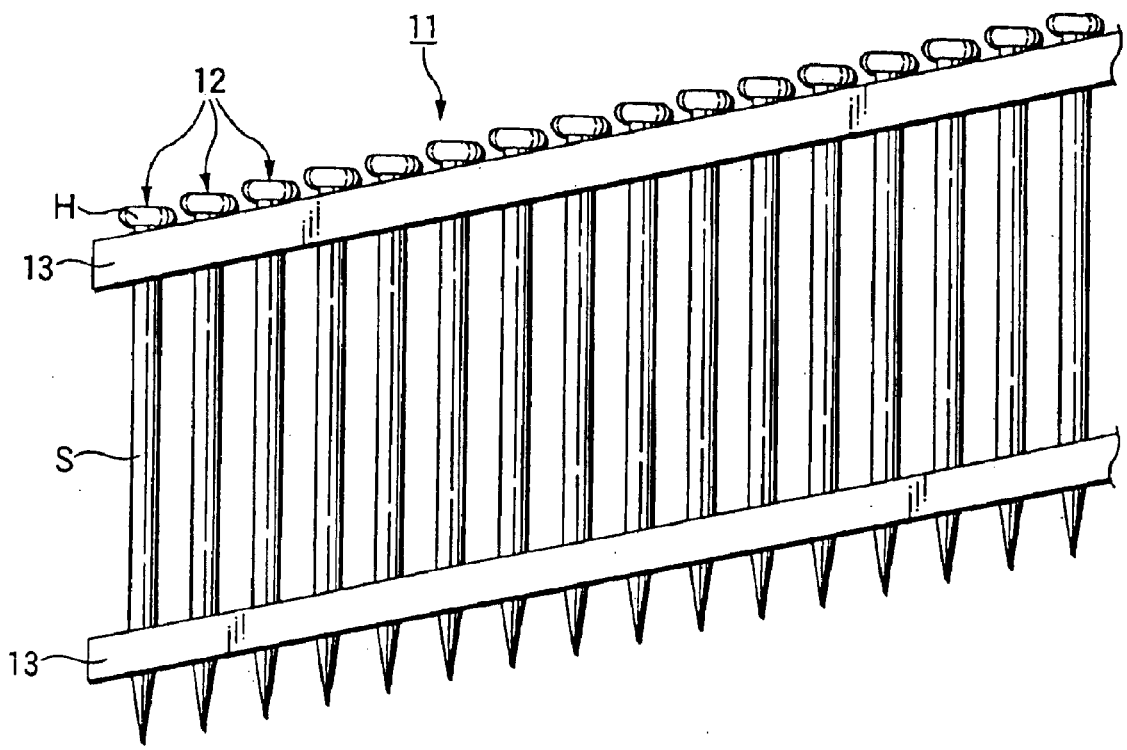
FIG. 1 is a front view of connected nails showing an embodiment of the present invention.
Figure 2:
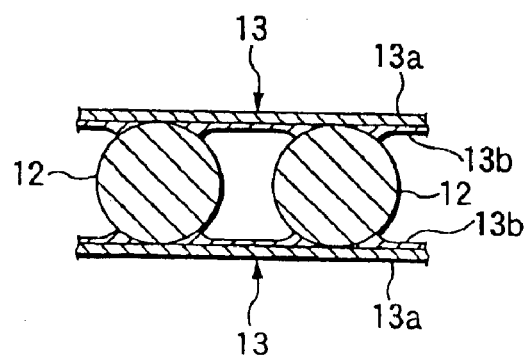
FIG. 2 is a cross-sectional view of the connected nails shown in FIG. 1.

Embodiments of the present invention are explained in detail in conjunction with drawings. FIG. 1 and FIG. 2 indicate stick-type connected nails 11 (hereinafter simply referred to as "connected nails 11"). Connecting bands 13 are glued to both surfaces of shaft portions of nails 12 which are arranged in parallel in an equidistant manner at two positions, that is, upper ends (below heads) of the shaft portions and lower ends of the shaft portions so as to connect the nails 12 to each other.

As shown in FIG. 2, the connecting bands 13 are formed by coating heat-fusible adhesives 13b to one-side surfaces of tapes 13a made of craft paper. By pressing the heated nails 12 to adhesive layers 13b, the heat-fusible adhesives 13b are fused and are closely glued to the nails 12. Thereafter, when the adhesives 13b are hardened by cooling, the nails 12 and the connecting bands 13 are glued to each other and the connecting bands 13 are solidified like plates thus forming the connected nails 11. Here, the connecting bands may be made of resin tapes or the like other than the paper tapes.

Figure 3:
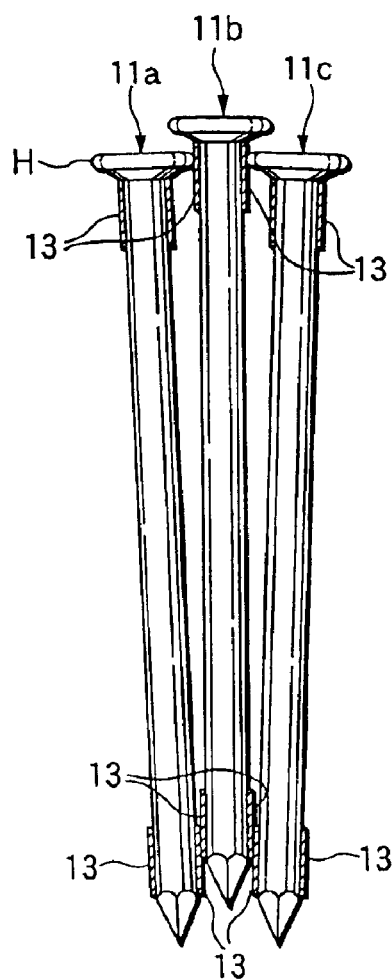
FIG. 3 is a explanatory view showing the state that the connected nails shown in FIG. 1 are loaded into a multiple loading type nail magazine.

When a plural sheets of connected nails 11 are loaded in a multiple-loading type nail magazine in a superposed manner (not shown in the drawing), a spring-type pressure plate of the nail magazine pushes the connected nails from one side and a plurality of sheets of connected nails are pressed to each other with the vertical positions of respective heads thereof displaced as shown in FIG. 3. However, with respect to neighboring connected nails, the heads of the connected nails 11a, 11c which are disposed at the low position are brought into contact with the upper connecting band 13 of the connected nails 11b which are disposed at the high position and hence, there is no possibility that the heads of the connected nails 11a, 11c are tangled between nails of the connected nails 11b.

Further, the distal ends of the shaft portions of the connected nails 11a, 11b, 11c have their respective lower connecting bands 13 brought into contact with each other and hence, the distal ends are prevented from being entangled in a staggered manner.

Accordingly, when the connected nails positioned at the nail supply path side (for example, 11a) in the inside of the multiple-loading type nail magazine is fed by feeding pawls of a nailing machine, the connected nails 11a are smoothly moved while being brought into contact with the upper and lower connecting bands 13 of the neighboring connected nails 11b.

Figure 4:
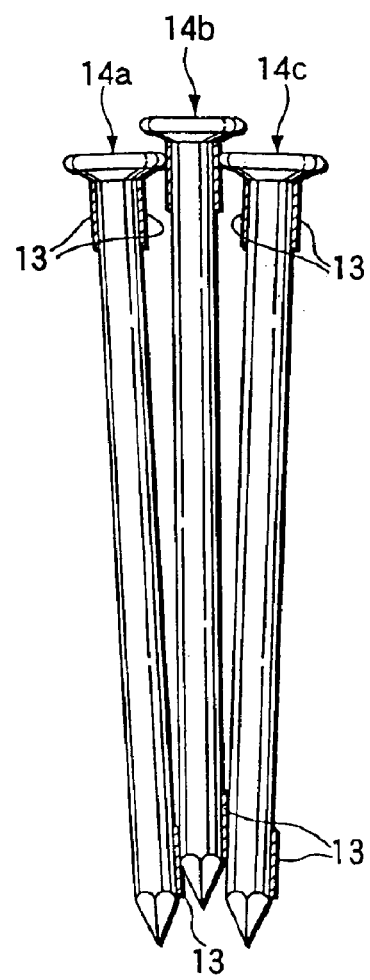
FIG. 4 is an explanatory view showing the state that connected nails are loaded into a multiple loading type nail magazine in another embodiment.
Figure 5:
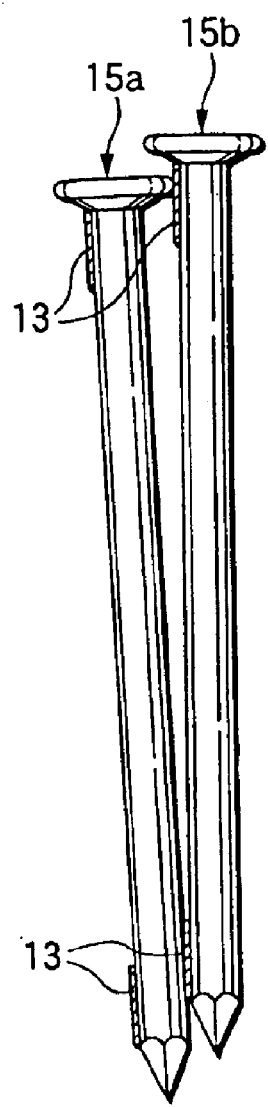
FIG. 5 is an explanatory view showing the state that connected nails are loaded into a multiple loading type nail magazine in another embodiment.
Figure 6:
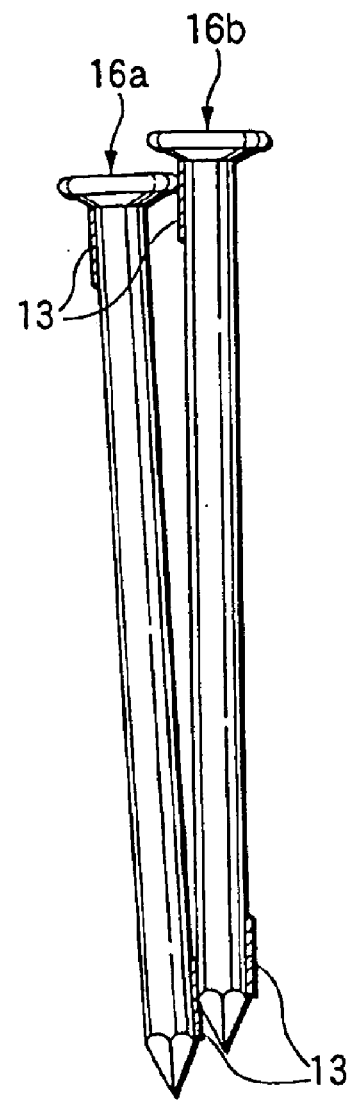
FIG. 6 is an explanatory view showing the state that connected nails are loaded into a multiple loading type nail magazine in another embodiment.
Figure 7:
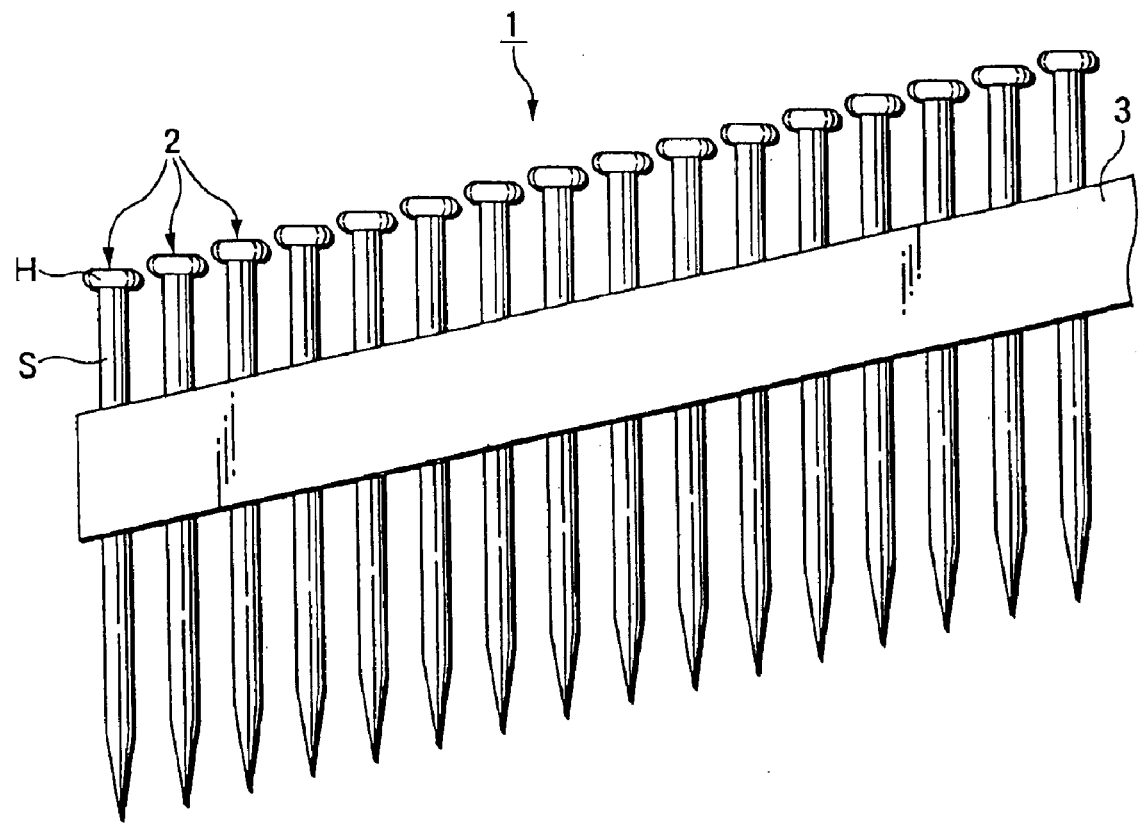
FIG. 7 is a front view of connected nails showing a conventional example.
Figure 8:
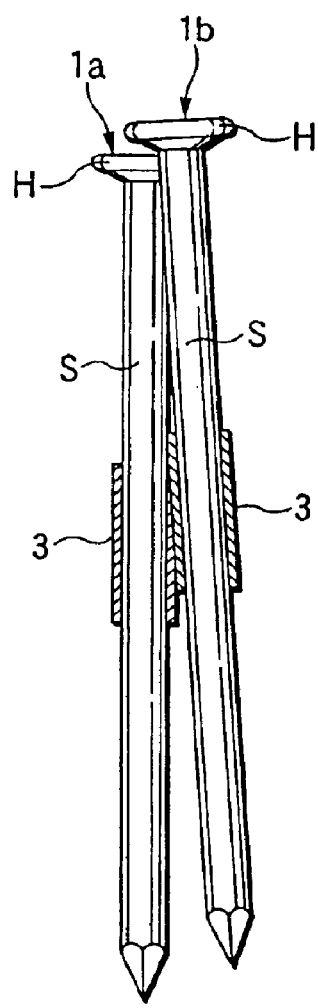
FIG. 8 is an explanatory view showing the state that the connected nails shown in FIG. 7 are loaded into a multiple loading type nail magazine.
Figure 9:
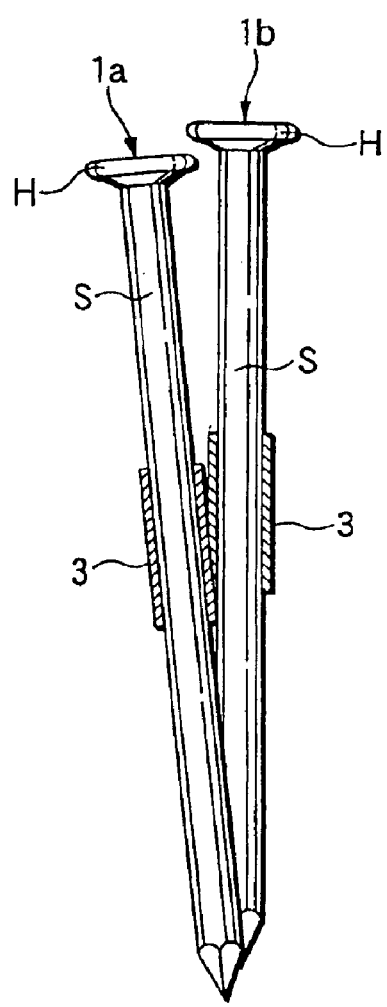
FIG. 9 is an explanatory view showing the state that the connected nails shown in FIG. 7 are loaded into a multiple loading type nail magazine.

FIG. 4 to FIG. 6 show other embodiments. With respect to connected nails 14a, 14b, 14c shown in FIG. 4, connecting bands 13 are glued to both sides of shaft portions of nails 12 at upper ends of the shaft portions, while a connecting band 13 is glued to only one-side surfaces of the shaft portions at lower portion of the shafts. The entanglement prevention effect which is equal to that obtained by the connected nails 11a, 11b, 11c of FIG. 3 can be obtained.

Further, when a nail magazine has a structure which determines the vertical relationship of a plurality of connected nails in order of loading, as shown in FIG. 5, connecting bands 13 may be glued to respective one-side surfaces of shaft portions of the connected nails 15a, 15b at positions in the vicinity of upper ends and lower ends of shaft portions. Alternately, the connecting band 13 may be glued to surfaces which correspond to the connected nails 15b which are disposed at a lower position. Further, the surfaces in the vicinity of the lower ends of the shaft portions to which the connecting bands 13 are glued may be either front surfaces or the rear surfaces. Further, as in the case of connected nails 16a, 16b shown in FIG. 6, the lower connecting bands 13 may be glued to surfaces opposite to the surfaces to which the upper connecting bands are glued.

The present invention is not limited to the above-mentioned embodiments and various modifications can be made within the technical scope of the present invention and it is needless to say that the present invention includes such modifications.

As has been described heretofore, according to the connected nails of the present invention, the nails are connected by gluing the connecting bands at two positions in the vicinity of the upper end portions and the lower end portions of the shaft portions of the nails. Hence, when a plural sheets of connected nails are loaded in the multiple loading type nail magazine of the nailing machine in a superposed manner, there is no possibility that the neighboring connected nails are entangled in a staggered manner so that the nail feeding can be smoothly performed.

Accordingly, it is unnecessary to provide a mechanism such as a separator or the like which separates the neighboring connected nails to the nail magazine. Hence, the constitution of the multiple-loading type nailing machine can be simplified so that the cost can be reduced while the operability of the nailing machine is enhanced due to the realization of the small and light-weighted nailing machine.

What is claimed is:

1. Stick-type connected nails comprising:
    a plurality of nails in parallel and in an equidistant manner,
    connecting bands glued to a shaft portion of each of said nails,
    wherein said nails are connected to each other by the connecting bands located at positions abutting an upper end and a lower end of each of said shaft portions,
    such that when the stick-type connected nails are superposed adjacent to other stick-type connected nails, the vertical position of respective heads thereof are offset.

2. The stick-type connected nails according to claim 1, wherein said connecting bands are made of paper.

3. The stick-type connected nails according to claim 1, wherein said connecting bands are made of resin.

4. The stick-type connected nails according to claim 1, wherein said connecting bands are provided on both sides of said shaft portions abutting both said upper end and said lower end of each of said shaft portions.

5. The stick-type connected nails according to claim 1, wherein said connecting bands are provided on both sides of said shaft portions abutting said upper end of each of said shaft portions and on one side of said shaft portions abutting said lower end of each of said shaft portions.

6. The stick-type connected nails according to claim 1, wherein said connecting bands are provided on one side of said shaft portions abutting both said upper end and said lower end of each of said shaft portions.

7. The stick-type connected nails according to claim 6, wherein said connecting band is abutting said lower end of each of said shaft portions and glued to surfaces opposite to surfaces to which said connecting band at said upper end of each of said shaft portions is glued.

8. The stick-type connected nails according to claim 1, wherein the lower end of each of said shaft portions of said nails contact the lower end connecting bands of at least one other adjacent stick-type connected nails.

* * * * *